United States Patent
Woo et al.

(10) Patent No.: US 8,694,848 B2
(45) Date of Patent: Apr. 8, 2014

(54) IMAGE PROCESSING APPARATUS AND CONTROL METHOD FOR PROCESSING AN IMAGE SIGNAL

(75) Inventors: Chung-ki Woo, Seoul (KR); Hak-bong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 13/227,147

(22) Filed: Sep. 7, 2011

(65) Prior Publication Data

US 2012/0272121 A1  Oct. 25, 2012

(30) Foreign Application Priority Data

Apr. 19, 2011 (KR) .................. 10-2011-0036368

(51) Int. Cl.
*H03M 13/00* (2006.01)
(52) U.S. Cl.
USPC ............................... 714/752; 714/10; 714/786
(58) Field of Classification Search
USPC ............................. 714/10, 752, 786
See application file for complete search history.

(56) References Cited

U.S. PATENT DOCUMENTS

| | | | | |
|---|---|---|---|---|
| 5,371,751 A | * | 12/1994 | Moriyama | 714/762 |
| 5,701,313 A | | 12/1997 | Purdham | |
| 6,822,761 B2 | * | 11/2004 | Sakaki et al. | 358/1.9 |
| 7,146,529 B2 | * | 12/2006 | Aguilar, Jr. et al. | 714/10 |
| 7,559,004 B1 | * | 7/2009 | Chang et al. | 714/758 |
| 7,681,106 B2 | * | 3/2010 | Jarrar et al. | 714/763 |
| 7,839,749 B2 | * | 11/2010 | Shiina et al. | 369/59.25 |
| 7,996,711 B2 | * | 8/2011 | Edwards et al. | 714/6.11 |
| 8,032,011 B2 | * | 10/2011 | Yoshioka | 386/326 |
| 8,225,175 B2 | * | 7/2012 | Chen et al. | 714/758 |
| 8,402,347 B2 | * | 3/2013 | Laurent et al. | 714/773 |
| 2005/0033831 A1 | | 2/2005 | Rashid | |

OTHER PUBLICATIONS

Communication from the European Patent Office issued Jun. 24, 2013 in counterpart European Application No. 11182802.6.

* cited by examiner

*Primary Examiner* — Esaw Abraham
(74) *Attorney, Agent, or Firm* — Sughrue Mion, PLLC

(57) ABSTRACT

An image processing apparatus and a method for controlling an image processing apparatus are disclosed. The method includes: primarily processing a first thread from among a plurality of threads for a preset process; generating and storing a first error correction code for data recorded in a stack area of a random access memory (RAM) corresponding to the first thread when a primary process terminates; processing a second thread which is different from the first thread from among the plurality of threads; determining whether the data of the stack area is valid on the basis of the stored first error correction code at a point of time when the process for the second thread terminates and a secondary process for the first thread begins; and secondarily processing the first thread by restoring the data having an error in the stack area in response to a determination that the data of the stack area is invalid.

10 Claims, 4 Drawing Sheets

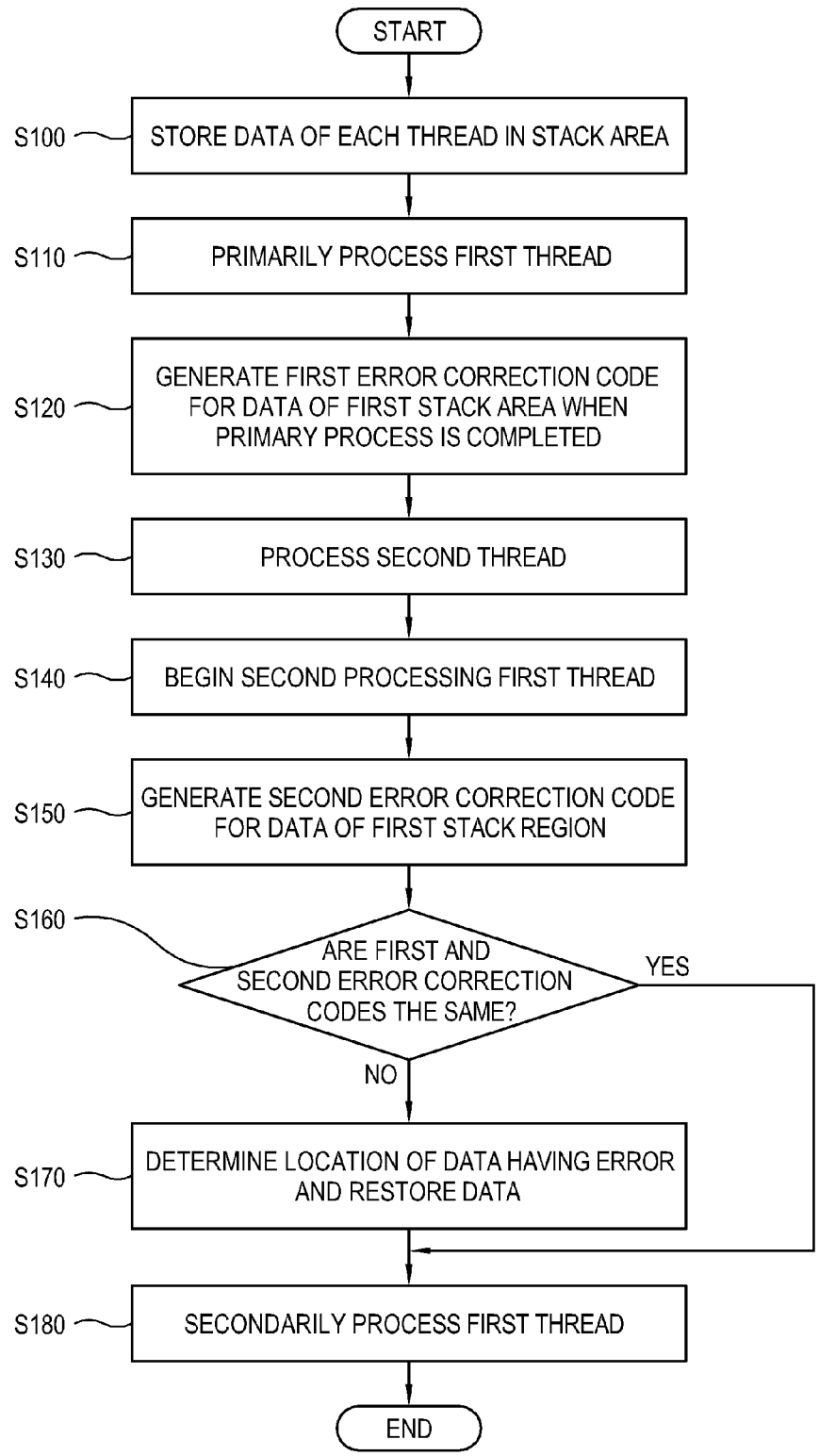

IMAGE PROCESSING APPARATUS AND CONTROL METHOD FOR PROCESSING AN IMAGE SIGNAL

CROSS-REFERENCE TO RELATED APPLICATION

This application claims priority from Korean Patent Application No. 10-2011-0036368, filed on Apr. 19, 2011 in the Korean Intellectual Property Office, the disclosure of which is incorporated herein by reference.

BACKGROUND

1. Field

Methods and apparatuses consistent with the exemplary embodiments relate to an image processing apparatus processing a video signal received from an exterior source for display as an image through a preset process and a method of controlling the apparatus. More particularly, the method and apparatus relate to an image processing apparatus having a structure where a data error and an error of all of the processes can be prevented by operating on the corresponding data loaded into a main memory.

2. Description of the Related Art

An image processing apparatus processes a video signal received from an exterior source through various video processes, and displays an image on its own display panel or outputs the video signal processed as above to an external device capable of displaying an image if the processing apparatus has no display panel. The image processing apparatus includes a central processing unit (CPU) and a random access memory (RAM). The image processing apparatus carries out a preset process as the CPU performs an operation by referring to data loaded into the RAM on software, i.e., an operating system (OS).

One process includes a plurality of threads. The term "thread" means a performance path in the process, i.e., a series of execution codes, and is a unit job performed in the CPU in accordance with a time assigned by a preset work scheduler. That is, the CPU selects and executes one of the threads in accordance with scheduling for a corresponding process, and completes one process as all the threads of that process are completely executed.

The data is loaded into the RAM when the CPU executes each thread. Data corresponding to the respective threads are assigned to certain addresses of the RAM. That is, each thread corresponds to a certain storage area, and data referred to when executing the corresponding thread is loaded into the storage area of the RAM which corresponds to the corresponding thread.

SUMMARY

The foregoing and/or other aspects may be achieved by providing a method of controlling an image processing apparatus, the method includes primarily processing a first thread from among a plurality of threads for a preset process; generating and storing a first error correction code for data recorded in a stack area of a random access memory (RAM) which corresponds to the first thread when the primary process terminates; processing a second thread different from the first thread from among the plurality of threads; determining whether the data of the stack area is valid on the basis of the stored first error correction code at a point of time when the process for the second thread terminates and a secondary process for the first thread begins; and secondarily processing the first thread by restoring the data having an error in the stack area in response to a determination that the data of the stack area is invalid.

The determining whether the data of the stack area is valid may includes generating a second error correction code for the data of the stack area; and determining that the data of the stack area is valid in response to the first error correction code being the second error correction code are the same, and determining that the data of the stack area is invalid in response to the first error correction code and the second error correction code being different.

The first error correction code and the second error correction code may be hamming codes calculated from a binary code of the data of the stack area.

The secondarily processing of the first thread by restoring the data having an error in the stack area may includes determining a location of a binary code where an error occurs in the data of the stack area on the basis of comparison results between the first error correction code and the second error correction code; and correcting the binary code at the location where the error occurs.

The method may further include secondarily processing the first thread on the basis of the data of the stack area in response to a determination that the data of the stack area is valid.

Another aspect of the exemplary embodiments may be achieved by providing an image processing apparatus including a main memory which includes stack areas respectively corresponding to a plurality of threads; and a central processing unit (CPU) which processes a first thread or a second thread from among the plurality of threads on the basis of data loaded into each stack area in accordance with a preset sequence, the CPU generating a first error correction code for the data recorded in the stack area corresponding to the first thread at a point of time when a primary process for the first thread terminates, determining whether the data of the stack area is valid on the basis of the first error correction code at a point of time when a process for the second thread terminates and a secondary process for the first thread begins, and selectively restoring data having an error in the stack area in accordance with results from validity determination.

The CPU may generate a second error correction code for the data of the stack area at a point of time when the secondary process begins, determine that the data of the stack area is valid in response to the first error correction code and the second error correction code being the same, and determine that the data of the stack area is invalid in response to the first error correction code and the second error correction code being different.

The first error correction code and the second error correction code may be hamming codes calculated from a binary code of the data of the stack area.

The CPU may determine a location of a binary code where an error occurs in the data of the stack area on the basis of comparison results between the first error correction code and the second error correction code, and correct the binary code at the location where the error occurs.

The CPU may secondarily process the first thread on the basis of the data of the stack area as a result of a determination that the data of the stack area is valid.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 4 is a flowchart showing a method of controlling the image processing apparatus of FIG. 1.

DETAILED DESCRIPTION OF EXEMPLARY EMBODIMENTS

Below, exemplary embodiments will be described in detail with reference to the accompanying drawings. Exemplary embodiments will be described regarding elements that directly relate to the spirit of the present inventive concept, and descriptions of other elements will be omitted. However, this does not mean that the elements whose descriptions are omitted are unnecessary for embodying an apparatus or system according to the inventive concept.

Figure 1:
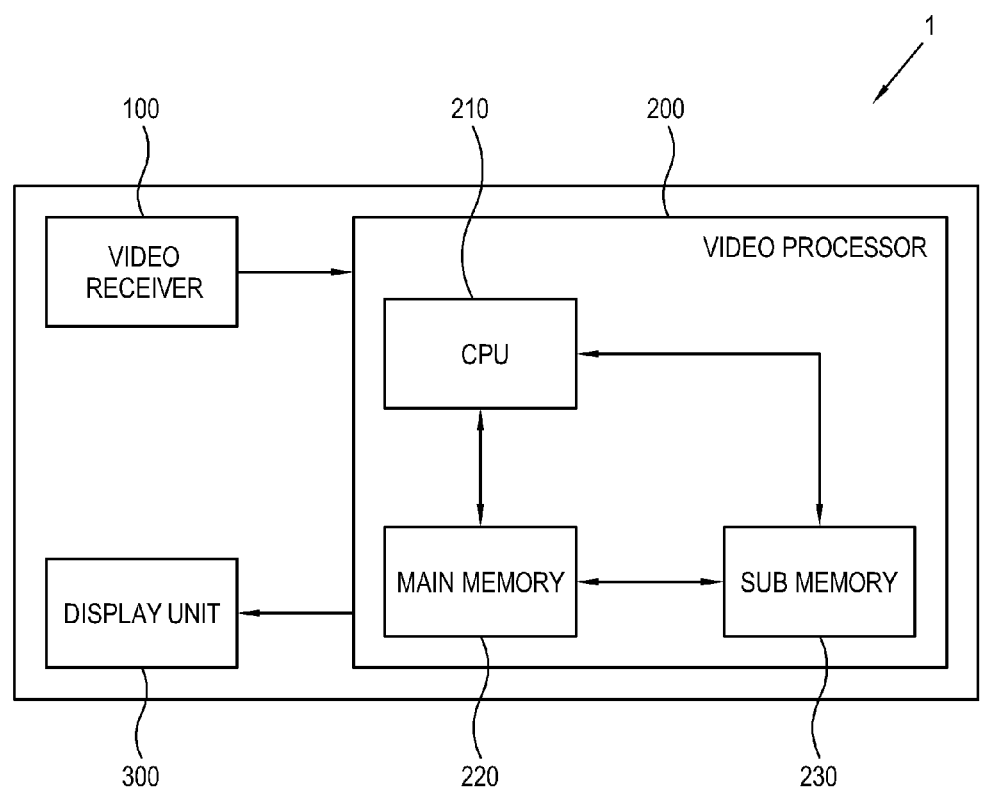
FIG. 1 is a block diagram of an image processing apparatus according to an exemplary embodiment.

FIG. 1 is a block diagram of an image processing apparatus according to an exemplary embodiment.

As shown therein, image processing apparatus 1 in this exemplary embodiment includes a video receiver 100 which receives a video signal from an exterior source, a video processor 200 which processes a video signal received by video receiver 100 through various preset processes, and a display unit 300 which displays an image based on video signal processed by the video processor 200.

In this exemplary embodiment, image processing apparatus 1 is achieved by a television (TV) provided with display unit 300, but is not limited thereto. For example, image processing apparatus 1 may be achieved in various forms, such as set-top box having no display unit.

Below, the elements of image processing apparatus 1 will be described.

Video receiver 100 receives a video signal through a wire or wirelessly and transmits the signal to video processor 200. Video receiver 100 may be achieved by various forms in accordance with a format of a received video signal or by a type of display apparatus 1. If a video signal is a broadcasting signal, video receiver 100 includes a tuner which is tunable to a channel which corresponds to the broadcasting signal.

For example, video receiver 100 may receive a radio frequency (RF) signal transmitted from a broadcasting station (not shown); and a video signal which complies with composite/component video, super video, Syndicat des Constructeurs des Appareils Radiorécepteurs et Téléviseurs (SCART), high definition multimedia interface (HDMI), DisplayPort, unified display interface (UDI), wireless HD standards, etc.

Video processor 200 performs various video processes which are previously set with respect to a video signal. Video processor 200 performs such a process and outputs a video signal to display unit 300, thereby allowing an image to be displayed on display unit 300.

The kind of video processes performed by video processor 200 is not limited, and may include, for example, decoding and encoding data corresponding to various video formats, de-interlacing, frame refresh rate conversion, scaling, noise reduction for improving picture quality, detail enhancement, etc. Video processor 200 may be achieved by individual configurations where respective processes are independently performed, or by an integrated configuration where many functions are integrated.

Also, the processes performed by video processor 200 are not limited to the video-related processes, and alternatively may be achieved in various kinds and types of processes supported by image processing apparatus 1.

Display unit 300 displays an image based on a video signal output from video processor 200. Display unit 300 may be achieved by liquid crystal, plasma, light-emitting diode, organic light-emitting diode, surface-conduction electron-emitter, carbon nano-tube, nano-crystal, etc., but is not limited thereto.

Below, detailed configurations of video processor 200 will be described. The following descriptions are not provided for all configurations, but rather only for configurations directly related to the present inventive concept.

Video processor 200 includes a central processing unit (CPU) 210 for processing data, a main memory 220 into which data to be processed by CPU 210 is loaded, and a sub memory 230 in which the data to be loaded into main memory 220 is stored. CPU 210, main memory 220 and sub memory 230 are connected through a system bus, and therefore transmission of data and access thereto are possible.

CPU 210 may be achieved by a micro-processor. CPU 210 can have access to the data loaded into/stored in main memory 220 or sub memory 230. There is no limit to the amount or type of data to be processed by CPU 210, and thus the data may be digitalized video data, an operating system, an application for performing various functions, etc.

In main memory 220, the data to be processed by CPU 210 is temporarily stored or loaded. Main memory 220 is achieved by a random access memory (RAM) in which the loaded data is not maintained but rather is volatilized when powered off.

Main memory 220 is loaded with data to be executed and processed by CPU 210. That is, the data has to be loaded from sub memory 230 into main memory 220 such that CPU 210 can process the corresponding data stored in sub memory 230. Main memory 220 has addresses according to loading areas for the data, and CPU 210 has access to each address, thereby reading the data loaded into the corresponding address.

At least one of sub memories 230 has access to the system bus, and stores various characteristic data. Sub memory 230 may be internally provided in image processing apparatus 1, or may be connected as an external peripheral device to image processing apparatus 1. Sub memory 230 is a non-volatile memory in which data is not volatilized even when powered off, The sub memory 230 may be achieved by a flash memory, a hard disk drive (HDD), a solid state drive (SSD), an optical disc drive (ODD) such as a digital versatile disk (DVD) player or a Blu-ray disc (BD) player, etc.

With this configuration, the execution of a predetermined first process will be described.

The first process includes a plurality of threads such as a first thread, a second thread, and so on. Each thread is processed by CPU 210 in accordance with preset schedule. The schedule reflects a sequence regarding which thread, from among the plurality of threads included in the first process will be processed by CPU 210. Here, the first thread and the second thread are just given for the convenience of distinction, and the threads included in the first process are not limited to the two threads, i.e., the first thread and the second threads.

To execute the plurality of threads, CPU 210 processes the first thread for a predetermined period of time, and then goes on to the second thread. As necessary, CPU 210 may return to the first thread after processing the second thread. In this manner, CPU 210 selectively processes each thread in accordance with the schedule. Such a switching operation of CPU 210 between the threads, i.e., a changing operation of CPU 210 to the thread to be processed will be called a context switch.

Each thread corresponds to data to be independently referred to. In other words, there is data to be referred to for processing only the first thread in the situation where CPU 210 processes the first thread. As an example of the data, there is a local variable, etc., in a function when the corresponding function is executed by CPU 210.

The data corresponding to the first thread is independent of other threads, such as the second thread, so that the data to be used for the first process can be stored in a certain storage area corresponding to each thread when loaded into main memory 220. Such a storage area is called a stack area, and the stack areas are set up to be distinctive from one another in main memory 220, according to the respective threads.

Figure 2:
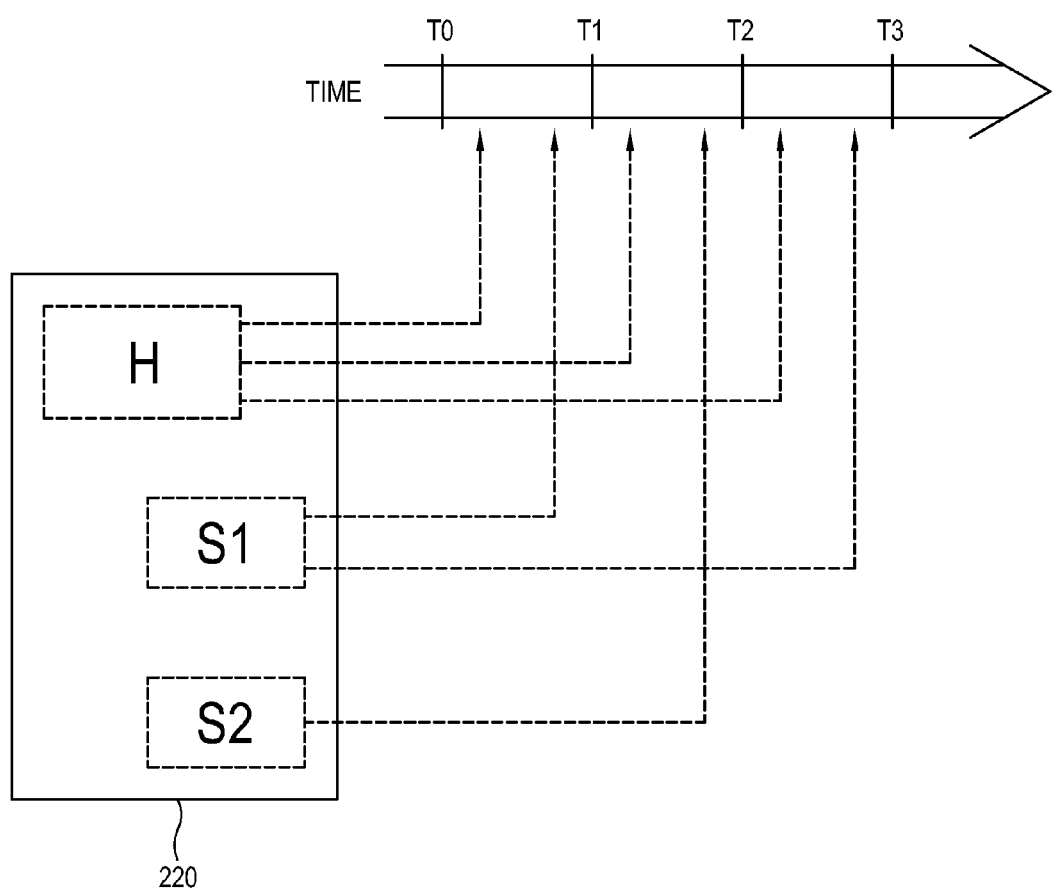
FIG. 2 is a conceptual view showing that data of each stack area is referred to when a thread is processed in sequence, in the image processing apparatus of FIG. 1.

Upon data for each thread being loaded into the stack area, CPU 210 reads and refers to the data from the corresponding stack area as shown in FIG. 2 when processing each thread in accordance with the preset schedule/sequence of the first process.

FIG. 2 is a conceptual view showing that data of each stack area is referred to when a thread is processed in accordance with sequence.

As shown in FIG. 2, suppose that points of time T0, T1, T2 and T3 are sequentially given and the CPU 210 is scheduled to process the first thread between time periods T0 and T1, the second thread between time periods T1 and T2, and the first thread between time periods T2 and T3.

To distinguish the processes of the first thread, the process between the time periods T0 and T1 will be called a primary process for the first thread, and the process between the time periods T2 and T3 will be called a secondary process for the first thread.

Main memory 220 is set up to have a stack area S1 corresponding to the first thread and a stack area S2 corresponding to the second thread, and the stack areas S1 and S2 are loaded with data corresponding to the respective threads.

Also, data in common to both the first thread and the second thread is stored in a specific area H of the main memory 220, which will be called a heap area H.

CPU 210 can call for data from the stack area Si when primarily processing the first thread, and update the data of the stack area S1 during the primary process. CPU 210 calls for data from the stack area S2 when processing the second thread. Then, CPU 210 calls for the data from the stack area S1 again when secondarily processing the first thread.

Regarding the first thread, an error may occur in the data of the stack area S1 due to various factors between a point of time T1 at which the primary process for the first thread terminates and a point of time T2 at which the secondary process for the first thread begins.

For example, while CPU 210 processes the second thread after the context switch happens at the point of time T1, the data of not the stack area S2 but the stack area S1 may be updated. In this situation, since an unintended error occurs in the data of stack area S1, an error may occur while the CPU 210 processes the first thread after the context switch happens at the point of time T2, and further an error may occur throughout the first process.

To prevent such a situation, the present exemplary embodiment is configured as follows. In the following exemplary embodiment, the first thread will be taken as an example, but this situation for the first thread may also be applied to other situations such as with the second thread.

CPU 210 generates a first error correction code for the data recorded in the stack area S1 at the point of time T1 when the primary process for the first thread terminates. Then, CPU 210 determines the validity of data in the stack area S1 on the basis of the first error correction code at the point of time T2 when the secondary process for the first thread begins after the context switch to another thread such as the second thread.

In accordance with results from the determination of validity, CPU 210 operates selectively as follows. In response to a determination that the data of the stack area S1 is valid, CPU 210 performs the secondary process for the first thread on the basis of data in the stack area S1. On the other hand, in response to a determination that the data of stack area S1 is invalid, CPU 210 restores the data of stack area S1 by correcting an error, and then performs the secondary process.

Through the above processes, the error of the stack area, generated at the context switch to another thread, is detected and corrected in order to prevent error in the thread and all of the processes.

Below, a method of determining validity will be described in detail.

CPU 210 generates and stores the first error correction code regarding the data recorded in stack area S1 at point of time T1. A storage location for the first error correction code may be set up at a certain address of main memory 220, or set up in a flash memory (not shown) separately provided in CPU 210.

CPU 210 generates a second error correction code for the data recorded in the stack area at the point of time T2. The method of generating the second error correction code is the same as that of the first error correction code, and it will be described later.

CPU 210 compares the first error correction code and the second error correction code at the point of time T2. In response to a determination, based on a result of the comparison between the first error correction code and the second error correction code are the same, CPU 210 determines that the data of the stack area S1 is valid. On the other hand, in response to a determination as a result of the comparison, that the first error correction code and the second error correction code are not the same, CPU 210 determines that the data of stack area S1 is invalid and that an error has occurred.

Below, will be described the method of generating the first error correction code and the second error correction code, and the method of detecting and restoring a location of data where an error occurs, in response to a determination that the corresponding data of stack area S1 has an error.

The data of stack area S1 is represented as a binary code of '0' and '1'. The error correction code including the first error correction code and the second error correction code may be achieved by a hamming code produced from the binary code of the data recorded in such a stack area.

The hamming code is from technology related to a parity technique, and is capable of detecting not only an error of data but also an error occurring at a location of the data, as opposed to a general parity check. CPU 210 groups the binary code of the data of the stack area as a unit of bits and generates the hamming code in accordance with a preset process, which can be achieved by various methods.

Figure 3:
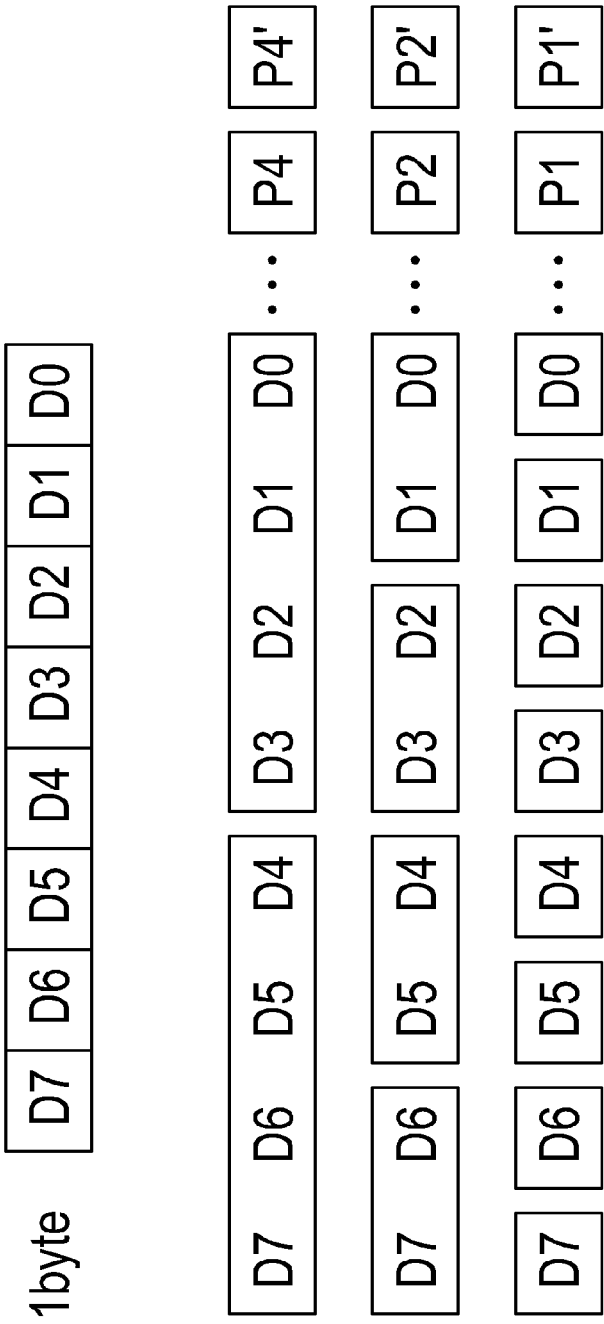
FIG. 3 is a conceptual view showing a method of generating a hamming code for one byte of data in the image processing apparatus of FIG. 1.

Below, an example of detecting and correcting an error of predetermined data will be described with reference to FIG. 3. FIG. 3 is a conceptual view showing a method of generating the hamming code for data of one byte in the image processing apparatus of FIG. 1.

As shown in FIG. 3, 1 byte of data includes data a total of 8 bits from the first bit of D0 to the eighth bit of D7.

Here, the bits may be grouped by a multiple of 2 on the basis of adjacent bit locations. For example, 8 bits may be grouped by three methods, i.e., grouped in the forms of one bit a group, adjacent two bits a group, and adjacent four bits a group.

In the case of the four bits a group, 8 bits are grouped into two of (D7, D6, D5, D4) and (D3, D2, D1, D0). Also, in the case of the two bits a group, 8 bits are grouped into four of (D7, D6), (D5, D4), (D3, D2) and (D1, D0). Further, if the bits are not grouped, 8 bits are eight of D7, D6, D5, D4, D3, D2, D1 and D0, respectively, in bit order.

If a parity value is P4 and P4' in the case of the four bits a group, a parity value is P2 and P2' in the case of the two bits a group, and a parity value is P1 and P1' in the case of one bit a group, each parity value is calculated as follows.

$$P4=D7(+)D6(+)D5(+)D4/P4'=D3(+)D2(+)D1(+)D0$$

$$P2=D7(+)D6(+)D3(+)D2/P2'=D5(+)D4(+)D1(+)D0$$

$$P1=D7(+)D5(+)D3(+)D1/P1'=D6(+)D4(+)D2(+)D0$$

Here, "(+)" means an even parity operation.

Assume that the preceding data is [1,0,1,0,1,0,1,0] and the following data [1,0,1,1,1,0,1,0], i.e., the fifth bit from the right side of the preceding data is varied. If this situation is applied to the above parity calculating equations, the following values are calculated.

In the case of the preceding data, $$P4=1(+)0(+)1(+)0=0/P4'=1(+)0(+)1(+)0=0$$

$$P2=1(+)0(+)1(+)0=0/P2'=1(+)0(+)1(+)0=0$$

$$P1=1(+)1(+)1(+)1=0/P1'=0(+)0(+)0(+)0=0$$

In the case of the following data, $$P4=1(+)0(+)1(+)1=1/P4'=1(+)0(+)1(+)0=0$$

$$P2=1(+)0(+)1(+)0=0/P2'=1(+)1(+)1(+)0=1$$

$$P1=1(+)1(+)1(+)1=0/P1'=0(+)1(+)0(+)0=1$$

Here, if an XOR operation is applied to P4, P4', P2, P2', P1, and P1' of each of the preceding data and the following data, the hamming code is calculated as follows.

$$(P4,P2,P1)=(1,0,0)/(P4',P2',P1')=(0,1,1)$$

Among these, the parities having a value of 1 are P4, P2' and P1', and the bit corresponding to all of these parities is D4, i.e., the fifth bit from the right side. Thus, in response to a detection of a bit location where an error occurs, CPU 210 converts the corresponding bit of 0 into 1, or converts the corresponding bit of 1 into 0, thereby recovering the corresponding data.

However, such a method is simply an example of detecting the bit location through the hamming code. Alternatively, without limiting the present inventive concept, various algorithms or methods may be used to detect a location where an error occurs. The hamming code is commonly used in mathematical and computer technology, and thus more detailed descriptions thereof will be avoided.

As above, according to an exemplary embodiment, CPU 210 sets up stack areas respectively corresponding to a plurality of threads in main memory 220, and loads data for each thread into each stack area. CPU 210 then generates the first error correction code for the data recorded in the corresponding stack area at a point of time when the primary process of the first thread for error detection terminates, i.e., T1, and generates the second error correction code for the data recorded in the corresponding stack area at a point of time when the secondary process of the first thread begins, i.e., T2.

CPU 210 compares the first error correction code and the second error correction code, and performs the secondary process for the first thread after detecting and restoring the error location of the corresponding data in response to a determination made that the two codes are different as a result of the comparison.

Thus, the first thread and all the processes involving the first thread are prevented from including an error.

Below, a control method of the image processing apparatus 1 according to an exemplary embodiment will be described with reference to FIG. 4. FIG. 4 is a flowchart showing the method of controlling the apparatus.

As shown in FIG. 4, when the process begins, CPU 210 stores the data of each thread in a corresponding stack area (S100).

CPU 210 calls for the data of the first stack area which corresponds to the first thread, in accordance with the scheduling requirement, and performs the primary process for first thread (S110). CPU 210 generates and stores the first error correction code for the data of the first stack area when the primary process for the first thread terminates (S120).

CPU 210 processes the second thread in accordance with the scheduling requirement (S130).

CPU 210 begins the secondary process for the first thread in accordance with the scheduling requirement after the process for the second thread terminates (S140). At this point of time, CPU 210 generates the second error correction code for the data of the first stack area (S150).

CPU 210 then determines whether the first error correction code and the second error correction code are the same (S160).

In response to a determination that the two codes are the same, CPU 210 calls for the data of the first stack area and performs the secondary process for the first thread (S180).

On the other hand, in response to a determination that the two codes are not the same, CPU 210 determines a location where an error occurs in the data of the first stack area, and corrects the error of the data (S170). In response to the data having the error being completely restored, CPU 210 calls for the restored data of the first stack area and performs the secondary process for the first thread (S180).

Thus, at the context switch for the plurality of threads, it is possible to prevent an error in execution of the first thread that would result due to an error in the data of the stack area which corresponds to the first thread.

In the above exemplary embodiments, CPU 210 determines a location of data where an error occurs and restores it, but is not limited thereto. For example, CPU 210 may control a warning message regarding a data error to be displayed when detecting the data error, or may control all the threads executed until now, or an execution code of a first thread to be displayed.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling an image processing apparatus, the method comprising:
   primarily processing a first thread from among a plurality of threads for a preset process;
   generating and storing a first error correction code for data recorded in a stack area of a memory which corresponds to the first thread, in response to a termination of a primary process;

processing a second thread which is different from the first thread from among the plurality of threads;

determining whether the data of the stack area is valid on the basis of the stored first error correction code at a point of time defined by the termination of a process for the second thread terminating and a secondary process for the first thread beginning; and secondarily processing the first thread by restoring the data having an error in the stack area in response to a determination that the data of the stack area is invalid.

2. The method according to claim 1, wherein the determining of whether the data of the stack area is valid comprises:

generating a second error correction code for the data of the stack area; and determining that the data of the stack area is valid in response to the first error correction code and the second error correction code being the same, and determining that the data of the stack area is invalid in response to the first error correction code and the second error correction code being different.

3. The method according to claim 2, wherein the first error correction code and the second error correction code are hamming codes calculated from a binary code of the data of the stack area.

4. The method according to claim 2, wherein the secondarily processing of the first thread by restoring the data having an error in the stack area comprises:

determining a location of a binary code where an error occurs in the data of the stack area on the basis of comparison results between the first error correction code and the second error correction code; and correcting the binary code at the location where the error occurs.

5. The method according to claim 1, further comprising secondarily processing the first thread on the basis of the data of the stack area in response to a determination that the data of the stack area is valid.

6. An image processing apparatus comprising:

a main memory which comprises stack areas respectively corresponding to a plurality of threads; and a central processing unit (CPU) which processes a first thread or a second thread from among the plurality of threads on the basis of data loaded into each stack area in accordance with a preset sequence, the CPU generating a first error correction code for the data recorded in the stack area which corresponds to the first thread at a point of time in response to a termination of a primary process for the first thread, determining whether the data of the stack area is valid on the basis of the first error correction code at a point of time in response to a termination of a process for the second thread and a secondary process for the first thread begins, and selectively restoring data having an error in the stack area in accordance with results from determining validity.

7. The image processing according to claim 6, wherein the CPU generates a second error correction code for the data of the stack area at a point of time in response to the secondary process beginning, determines that the data of the stack area is valid in response to the first error correction code and the second error correction code being the same, and determines that the data of the stack area is invalid in response to the first error correction code and the second error correction code being different.

8. The image processing apparatus according to claim 7, wherein the first error correction code and the second error correction code are hamming codes calculated from a binary code of the data of the stack area.

9. The image processing apparatus according to claim 7, wherein the CPU determines a location of a binary code where an error occurs in the data of the stack area on the basis of comparison results between the first error correction code and the second error correction code, and corrects the binary code at the location where the error occurs.

10. The image processing apparatus according to claim 6, wherein the CPU secondarily processes the first thread on the basis of the data of the stack area in response to a determination that the data of the stack area is valid.

* * * * *